(12) United States Patent
Redpath

(10) Patent No.: US 9,274,679 B2
(45) Date of Patent: *Mar. 1, 2016

(54) CARE LABEL METHOD FOR A SELF SERVICE DASHBOARD CONSTRUCTION

(71) Applicant: International Business Machines Corporation, Armonk, NY (US)

(72) Inventor: Richard Redpath, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 290 days.

This patent is subject to a terminal disclaimer.

(21) Appl. No.: 13/933,123

(22) Filed: Jul. 1, 2013

(65) Prior Publication Data

US 2014/0059454 A1    Feb. 27, 2014

Related U.S. Application Data

(63) Continuation of application No. 12/828,289, filed on Jun. 30, 2010, now Pat. No. 8,495,511.

(51) Int. Cl.
*G06F 3/0481* (2013.01)

(52) U.S. Cl.
CPC .................................. *G06F 3/04817* (2013.01)

(58) Field of Classification Search
CPC ...................................................... G06F 3/0481
See application file for complete search history.

(56) References Cited

U.S. PATENT DOCUMENTS

| | | | | |
|---|---|---|---|---|
| 3,775,775 A | * | 12/1973 | Mazzenga | 2/80 |
| 7,546,543 B2 | * | 6/2009 | Louch et al. | 715/762 |
| 7,707,514 B2 | * | 4/2010 | Forstall et al. | 715/810 |
| 7,752,556 B2 | * | 7/2010 | Forstall et al. | 715/761 |
| 7,954,064 B2 | * | 5/2011 | Forstall et al. | 715/779 |
| 8,038,535 B2 | * | 10/2011 | Jensen | 463/42 |
| 8,595,186 B1 | * | 11/2013 | Mandyam et al. | 707/632 |
| 2006/0085754 A1 | * | 4/2006 | Li et al. | 715/763 |
| 2006/0277469 A1 | * | 12/2006 | Chaudhri et al. | 715/709 |
| 2006/0287106 A1 | * | 12/2006 | Jensen | 463/42 |
| 2007/0101288 A1 | * | 5/2007 | Forstall et al. | 715/781 |
| 2007/0101291 A1 | * | 5/2007 | Forstall et al. | 715/805 |
| 2007/0101297 A1 | * | 5/2007 | Forstall et al. | 715/841 |
| 2007/0118813 A1 | * | 5/2007 | Forstall et al. | 715/805 |
| 2007/0130541 A1 | * | 6/2007 | Louch et al. | 715/804 |
| 2007/0162850 A1 | * | 7/2007 | Adler et al. | 715/700 |
| 2008/0168367 A1 | * | 7/2008 | Chaudhri et al. | 715/764 |
| 2008/0168368 A1 | * | 7/2008 | Louch et al. | 715/764 |
| 2008/0168382 A1 | * | 7/2008 | Louch et al. | 715/781 |
| 2009/0024944 A1 | * | 1/2009 | Louch et al. | 715/765 |
| 2009/0228824 A1 | * | 9/2009 | Forstall et al. | 715/779 |
| 2009/0322782 A1 | * | 12/2009 | Kimchi et al. | 345/619 |

(Continued)

*Primary Examiner* — Doon Chow
*Assistant Examiner* — David Choi
(74) *Attorney, Agent, or Firm* — Steven M. Greenberg, Esq.; CRGO Law

(57) ABSTRACT

Embodiments of the present invention address deficiencies of the art in respect to user interfaces and provide a novel and non-obvious method, system and computer program product for graphically labeling widgets in a mashup dashboard. In an embodiment of the invention, a method for graphically labeling widgets in a mashup dashboard can be provided. The method can include identifying a widget, assigning a care label to the identified widget based on a type of datafeed payload information associated with the identified widget and displaying the identified widget with the assigned care label in a user interface to enable a user to make a visually matched selection of widgets to create a self service dashboard.

10 Claims, 3 Drawing Sheets

(56) References Cited

U.S. PATENT DOCUMENTS

| | | |
|---|---|---|
| 2009/0327976 A1* | 12/2009 | Williamson et al. ........... 715/863 |
| 2010/0023875 A1* | 1/2010 | Choudhary et al. ........... 715/748 |
| 2010/0030901 A1* | 2/2010 | Hallberg et al. .............. 709/228 |
| 2010/0037157 A1* | 2/2010 | Chang et al. ................... 715/764 |
| 2010/0115471 A1* | 5/2010 | Louch et al. ................... 715/849 |
| 2010/0138295 A1* | 6/2010 | Caron et al. ................ 705/14.49 |
| 2010/0153865 A1* | 6/2010 | Barnes et al. ................. 715/762 |
| 2010/0211886 A1* | 8/2010 | Forstall et al. ................. 715/745 |
| 2010/0229095 A1* | 9/2010 | Forstall et al. ................. 715/733 |
| 2010/0333037 A1* | 12/2010 | Pavlovski et al. ............ 715/848 |
| 2011/0022955 A1* | 1/2011 | Gilfix ............................ 715/702 |
| 2011/0231790 A1* | 9/2011 | Forstall et al. ................. 715/779 |
| 2011/0246914 A1* | 10/2011 | Solaja et al. .................. 715/764 |
| 2012/0005577 A1* | 1/2012 | Chakra et al. ................. 715/702 |
| 2012/0005593 A1* | 1/2012 | Redpath ........................ 715/747 |
| 2012/0030567 A1* | 2/2012 | Victor ........................... 715/702 |

* cited by examiner

CARE LABEL METHOD FOR A SELF SERVICE DASHBOARD CONSTRUCTION

CROSS-REFERENCE TO RELATED APPLICATIONS

This application is a continuation of U.S. patent application Ser. No. 12/828,289, filed Jun. 30, 2010, the entirety of which is incorporated herein by reference.

BACKGROUND OF THE INVENTION

1. Field of the Invention

The present invention relates to the field of user interfaces and more particularly to software that facilitates self service dashboard construction.

2. Description of the Related Art

Individuals are sometimes faced with the task of monitoring certain information feeds such as stock values, weather reports, news headlines or the status of one or more computers. In an effort to facilitate the administration of such information feeds, dashboard-like user interfaces are often used. A dashboard is a user interface that is designed to provide visual presentations of information feeds. A dashboard may obtain information from the local operating system in a computer, from one or more remote applications that may be running, and/or from one or more remote sites on a network, and present it all on one interface. Dashboard software, however, can be costly to develop, expensive to purchase, difficult to use and complicated to understand.

Another approach to monitoring multiple information feeds includes the use of mashups. A mashup is a web application that combines data or user interface elements from more than one source into a single integrated tool. Content used in mashups is typically sourced from a third party via a public interface or API (web services). Other methods of sourcing content for mashups include web feeds (e.g. RSS or Atom), and screen scraping. The architecture of a mashup web application is composed of three parts: 1) the content provider, i.e., the source of the data or the information feed, 2) the application that integrates the different data sources and 3) the client web browser or the user interface of the mashup. Mashups, however, don't come without their drawbacks.

Mashup must be developed according to the needs of individual users, which customization can be costly. Further, mashups are hard-coded to constantly present defined data sources. This is not always desirable since real estate on computer desktops is valuable and users may only desire to view select data sources in certain cases. A conventional mashup, for example, may display information for a selection of information feeds being monitored. Due to the complexity of mashup and dashboard, it is almost impossible for the average user to construct a self service dashboard.

Therefore, there is a need to overcome the deficiencies with the prior art and more particularly for a more efficient way to create and render user interface elements that monitor multiple informational feeds.

BRIEF SUMMARY OF THE INVENTION

Embodiments of the present invention address deficiencies of the art in respect to user interfaces and provide a novel and non-obvious method, system and computer program product for graphically labeling widgets in a mashup dashboard. In an embodiment of the invention, a method for graphically labeling widgets in a mashup dashboard can be provided. The method can include identifying a widget, assigning a Care Label Event (CLE) with events types called care labels to the identified widget based on a type of datafeed payload information associated with the identified widget and displaying the identified widget with the assigned care labels in a user interface to enable a user to make a visually matched selection of widgets to create a self service dashboard that can communicate automatically through events amongst the widgets In another embodiment of the invention, a computer program product comprising a computer usable medium embodying computer usable program code for graphically labeling widgets in a mashup dashboard can be provided. The computer program product can include computer usable program code for identifying a widget, computer usable program code for assigning a Care Label Event (CLE) with events types called care labels to the identified widget based on a type of datafeed payload information associated with the identified widget and computer usable program code for displaying the identified widget with the assigned care labels in a user interface to enable a user to make a visually matched selection of widgets to create a self service dashboard that can communicate automatically through events amongst the widgets.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention address deficiencies of the art in respect to user interfaces and provide a novel and non-obvious method, system and computer program product for graphically labeling widgets in a mashup dashboard. In an embodiment of the invention, a method for graphically labeling widgets in a mashup dashboard can be provided. The method can include identifying a widget, assigning a Care Label Event (CLE) with events types called care labels to the identified widget based on a type of datafeed payload information associated with the identified widget and displaying the identified widget with the assigned care labels in a user interface to enable a user to make a visually matched selection of widgets to create a self service dashboard that can communicate automatically through events amongst the widgets. The method can further include displaying such information as a hover for icons that represent a selection of widgets from a catalog as to help match with other.

Figure 1:
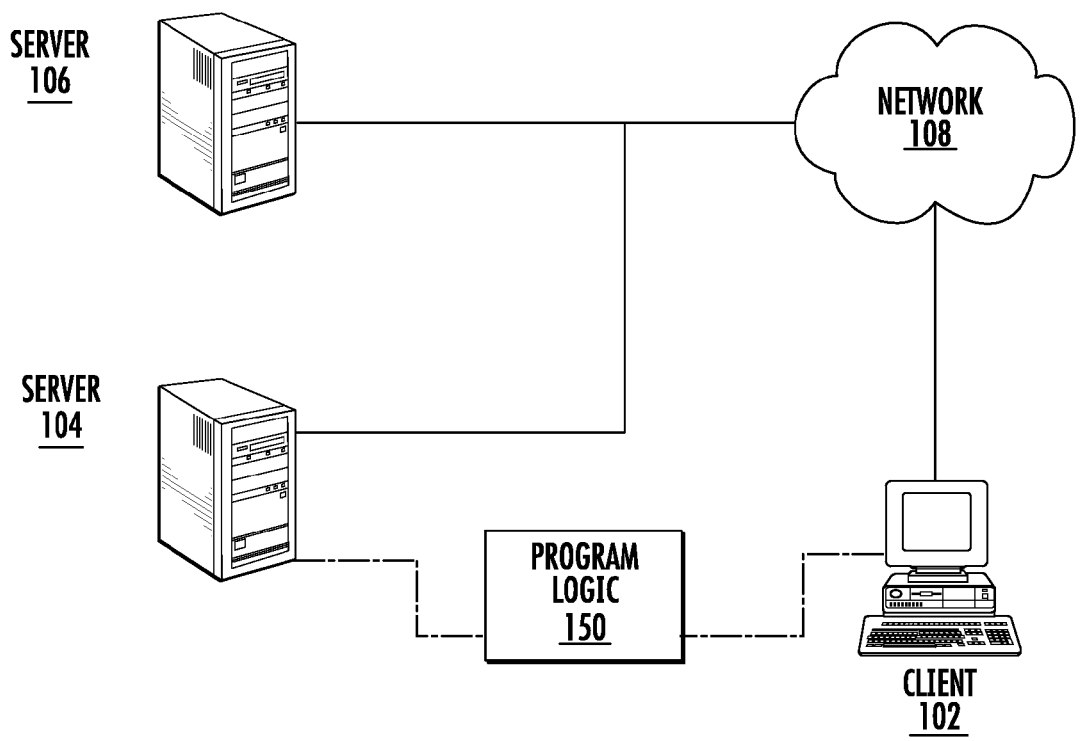
FIG. 1 is a block diagram illustrating a network architecture of a system for graphically labeling widgets in a mashup dashboard, in accordance with one embodiment of the present invention.

Referring now to the drawing figures in which like reference designators refer to like elements, there is shown in FIG. 1 a block diagram illustrating a network architecture of a system for automatically aggregating user interface components, in accordance with one embodiment of the present invention. The exemplary embodiments of the present invention adhere to the system architecture of FIG. 1. FIG. 1 shows an embodiment of the present invention wherein a client user 102 may interact with servers 104, 106 over a network 108, such as the Internet, the World Wide Web, a WAN or a LAN.

FIG. 1 shows client user 102 and servers 104,106 connected to network 108 via computers, such as desktop personal computers, workstations or servers. Servers 104, 106 include software engines that deliver data and/or user interface component functionality to client computer 102. The servers 104, 106 may adhere to any commercially available server platform, such as the Sun Microsystems J2EE platform, a Web-based application platform, an integrated platform for e-commerce or a content management system platform. It should be noted that although FIG. 1 shows only one client user 102 and two servers 104, 106, the system of the present invention supports any number of client users and servers connected via network 108.

FIG. 1 shows a system whereby a client application, represented by program logic 150, running on a client 102 assigns graphical labels to widgets in a mashup dashboard. The user interface elements include information received from servers 104, 106. Program logic 150 comprises computer source code, scripting language code or interpreted language code that is compiled to produce computer instructions that perform various functions of the present invention. In one embodiment of the present invention, the program logic 150 is a scripting language such as ECMAScript, Cascading style sheets, XML, XSLT, Javascript, AJAX, XUL, JSP, PHP, and ASP.

As explained above, program logic 150 may reside on a client 102, or a server (such as server 104) or any combination of the two. In one embodiment of the present invention, the program logic 150 is a client-server application having a client portion that resides on the computer of client user 102 and a server application that resides on a server, such as servers 104, 106.

In an embodiment of the present invention, the computer systems of client user 102 and servers 104, 106 are one or more Personal Computers (PCs), Personal Digital Assistants (PDAs), hand held computers, palm top computers, lap top computers, smart phones, game consoles or any other information processing devices. A PC can be one or more IBM or compatible PC workstations running a Microsoft Windows or LINUX operating system, one or more Macintosh computers running a Mac OS operating system, or an equivalent. In another embodiment, the computer systems of client user 102 and servers 104-106 are a server system, such as IBM RS/6000 workstations and servers running the AIX operating system.

In an embodiment of the present invention, the network 108 is a circuit switched network, such as the Public Service Telephone Network (PSTN). In another embodiment, the network 108 is a packet switched network. The packet switched network is a wide area network (WAN), such as the global Internet, a private WAN, a local area network (LAN), a telecommunications network or any combination of the above-mentioned networks. In yet another embodiment, the structure of the network 108 is a wired network, a wireless network, a broadcast network or a point-to-point network.

Figure 2:
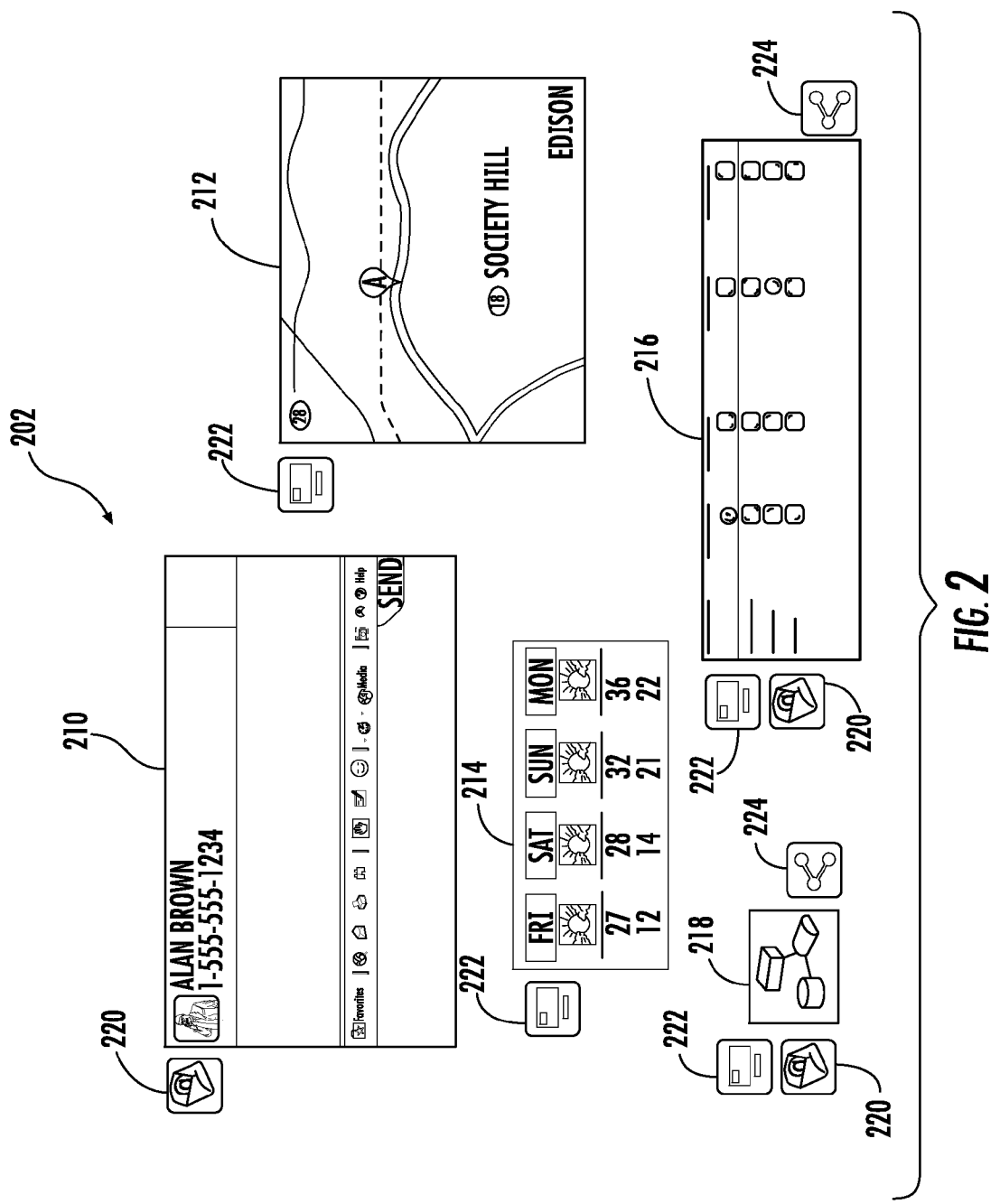
FIG. 2 is an illustration of a user interface including multiple user interface elements, in accordance with one embodiment of the present invention.

FIG. 2 is an illustration of a user interface 202 including multiple user interface elements 210, 212, 214, 216, 218, in accordance with one embodiment of the present invention. It should be noted that although the present invention is directed towards the monitoring of any type of data feed (regarding stock values, weather updates, computer statuses, sports scores, etc.), FIG. 2 depicts one example wherein a user interface is used to monitor status information for one or more computers or servers.

In embodiments, user interface 202 can be a conventional web browser that can includes an address text field (not shown) that can indicate a local location of an executable file on client 102 that provides graphically labeling widgets in the user interface. User interface 202 thereby executes the executable file, which produces the graphics displayed in user interface 202, as shown in FIG. 2.

In another embodiment of the present invention, address text field may indicate a Universal Resource Locator (URL) of a web site. Upon entering the appropriate URL, the web browser 202 sends a HyperText Transfer Protocol (HTTP) request for data to the appropriate web server, such as web server 106, corresponding to said URL. Subsequently, the web server 106 sends executable data to the web browser 202. The executable data received by the web browser 202 may be HTML or may comprise some or all of the program logic 150, which may be a scripting language such as XML, XSLT, Javascript, etc. Upon receiving the executable data sent by web server 106, web browser 202 executes the executable data, which produces the graphics displayed in user interface 202, as shown in FIG. 2.

As explained above, FIG. 2 shows user interface 202 including multiple user interface elements 210, 212, 214, 216, 218 which depict widget information that can include status information that is received about particular servers or computers. Status information about a computer or server includes memory usage information, CPU usage information, event information and executing process information. User interface element 210 includes a widget for instant messaging which includes a care label 220 indicating email information. User interface element 212 includes a map widget that is labeled by zipcode care label 222. User interface element 214 includes a weather widget that is labeled by zipcode care label 222 and shows a weather forecast for a selected zip code. User interface element 216 includes a datafeed scorecard widget that is labeled by datafeed care label 224, email information care label 220 and zipcode care label 222. User interface element 218 includes a datafeed that is labeled by datafeed care label 224, email information care label 220 and zipcode care label 222. Each of the user interface elements can aid a user to make visually matched selections of widgets or icons representing the widgets to create a self-service dashboard that can communicate automatically through events amongst the widgets.

Figure 3:
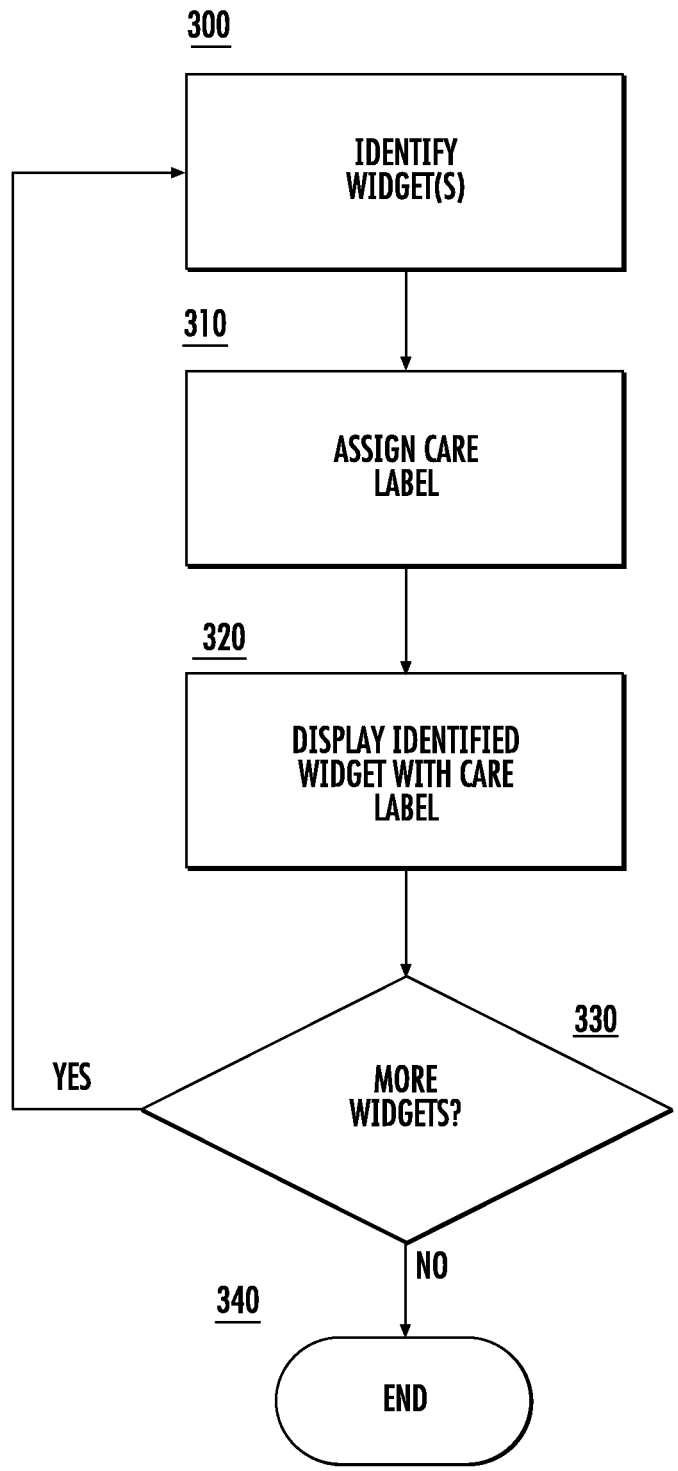
FIG. 3 is a flow chart showing the control flow of a process for graphically labeling widgets in a self service dashboard, in accordance with one embodiment of the present invention.

FIG. 3 is a flow chart showing the control flow of a process for automatically rendering user interface elements according to predefined rules, in accordance with one embodiment of the present invention. FIG. 3 depicts the process executed by program logic 150 residing on a client computer such as client 102. The client application may be a web browser, such as web browser 202, executing program logic 150.

In step 300, the program logic 150 identifies a first widget. In step 310, the program logic 150 assigns a care label 220, 222, 224 to the widget based on the type of datafeed payload information, if any. In step 320, the identified widget is displayed with its corresponding care label 220, 222, 224. The display of the identified widget may be by instantiation or by presentation of an icon which represents the identified widget and are stored in an icon catalog. The icon catalog can include a list of datafeeds which show the associated care labels in the payload of the datafeeds. In some embodiments, a datafeed could have multiple care labels, in other embodiments only one care label. In embodiments, the icon catalog can also have a list of icons for the datafeeds. Moreover, a Care Label Event (CLE) is an event, which can include a type of event called the care label. Some types of the Care Label Event (CLE) called care labels include but are not limited to, email, zipcode, temperature, internet protocol (IP), globally unique identifier (GUID) and geographic information system (GIS).

In step 330, a determination is made if there are any more widgets that yet to be labeled. If not, then the process can end at step 340. Otherwise, control flows to step 300 where the widget is identified.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

I claim:

1. A method for graphically labeling widgets in a mashup dashboard, the method comprising:
    identifying a widget;
    assigning a Care Label Event (CLE) with events types called care labels to the identified widget based on datafeed payload information associated with the identified widget; and,
    displaying a catalog icon representing the identified widget with the assigned care labels in a user interface to enable a user to make a visually matched selection of widgets to create a self service dashboard from the care labels and displaying a list of associated care labels to the identified widget by hovering a pointing device over the catalog icon representing the identified widget.

2. The method of claim 1, further comprising searching a catalog of icons based on care labels.

3. The method of claim 2, wherein the catalog of icons includes a list of datafeeds that show at least one associated care label in a payload of the datafeeds.

4. The method of claim 3, wherein the catalog of icons includes a list of icons of datafeeds that show at least one associated care label in a payload of the datafeeds.

5. The method of claim 1, wherein a care label is selected from the group consisting of email, zipcode, temperature, internet protocol, globally unique identifier and geographic information system.

6. A computer program product comprising a non-transitory computer usable medium embodying computer usable program code for graphically labeling widgets in a mashup dashboard, the computer program product comprising:
    computer usable program code for identifying a widget;
    computer usable program code for assigning a Care Label Event (CLE) with events types called care labels to the identified widget based on a type of datafeed payload information associated with the identified widget; and
    computer usable program code for displaying a catalog icon representing the identified widget with the assigned care labels in a user interface to enable a user to make a visually matched selection of widgets to create a self service dashboard from the care labels and displaying a list of associated care labels to the identified widget by hovering a pointing device over the catalog icon representing the identified widget.

7. The computer program product of claim 6, further comprising:
    computer usable program code for searching a catalog of icons based on care labels.

8. The computer program product of claim 7, wherein the catalog of icons includes a list of datafeeds that show at least one associated care label in a payload of the datafeeds.

9. The computer program product of claim 8, wherein the catalog of icons includes a list of icons of datafeeds that show at least one associated care label in a payload of the datafeeds.

10. The computer program product of claim 6, wherein a care label is selected from the group consisting of email, zipcode, temperature, internet protocol, globally unique identifier and geographic information system.

* * * * *